United States Patent
Xu et al.

(10) Patent No.: US 12,452,842 B2
(45) Date of Patent: Oct. 21, 2025

(54) DATA TRANSMISSION METHOD AND RELATED DEVICE

(71) Applicant: GUANGDONG OPPO MOBILE TELECOMMUNICATIONS CORP., LTD., Dongguan (CN)

(72) Inventors: Jing Xu, Dongguan (CN); Zuomin Wu, Dongguan (CN); Bin Liang, Dongguan (CN); Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 437 days.

(21) Appl. No.: 17/884,448

(22) Filed: Aug. 9, 2022

(65) Prior Publication Data

US 2022/0386291 A1   Dec. 1, 2022

Related U.S. Application Data

(63) Continuation of application No. PCT/CN2020/074678, filed on Feb. 10, 2020.

(51) Int. Cl.
*H04W 72/044* (2023.01)
*H04W 72/21* (2023.01)
*H04W 72/56* (2023.01)

(52) U.S. Cl.
CPC ......... *H04W 72/044* (2013.01); *H04W 72/21* (2023.01); *H04W 72/56* (2023.01)

(58) Field of Classification Search
CPC ... H04W 72/044; H04W 72/21; H04W 72/56; H04W 72/23; H04W 72/02; H04L 5/0053; H04L 5/0094
See application file for complete search history.

(56) References Cited

U.S. PATENT DOCUMENTS

2022/0086872 A1* 3/2022 Shimezawa ....... H04W 72/1268
2024/0106611 A1* 3/2024 Wang .................... H04L 5/0078

FOREIGN PATENT DOCUMENTS

| CN | 107889264 A | 4/2018 |
| CN | 110474750 A | 11/2019 |
| WO | 2019155637 A1 | 8/2019 |

OTHER PUBLICATIONS

LG Electronics R1-1910828: PUSCH enhancements for NR URLLC Oct. 2019 (Year: 2019).*

(Continued)

*Primary Examiner* — Rina C Pancholi
(74) *Attorney, Agent, or Firm* — Sheppard, Mullin, Richter &Hampton LLP

(57) ABSTRACT

The present disclosure provides a data transmission method and a related apparatus. The method includes: receiving, by a terminal, resource allocation information from a network device; determining, by the terminal, a first transmission resource based on the resource allocation information; and performing, by the terminal, data transmission with the network device over a second transmission resource and/or a third transmission resource in case that the first transmission resource satisfies a predetermined condition. The first transmission resource includes the second transmission resource and the third transmission resource. With the present disclosure, transmission resources are allocated in an NR-U system. The terminal can partition the transmission resource determined based on the resource allocation information into two transmission resources, and then perform data transmissions on the two resulting transmission resources, thereby avoiding insufficient transmission resources and transmission interruptions, which is advantageous in ensuring continuous data transmission.

15 Claims, 9 Drawing Sheets

(56) References Cited

OTHER PUBLICATIONS

International Search Report and Written Opinion dated Nov. 12, 2020 in International Application No. PCT/CN2020/074678. English translation attached.
Nokia et al. "Summary of Friday Offline Discussion on Potential Enhancements for PUSCH for NR URLLC (AI 7.2.6.1.3)", 3GPP TSG-RAN WG1 Meeting #96, R1-1903797, Mar. 3, 2019 (Mar. 3, 2019), section 4.
Extended European Search Report dated Dec. 7, 2022 received in European Patent Application No. EP20918885.3.
LG Electronics :"Pusch enhancementsfor NR URLLC" , 3GPP Draft ;R1-1910828 PUSCH Enhancements For. NR URLLC , 3rd Generation PartnershipProject(3GPP) , Mobile Competence CENTRE650, Route Des Lucioles ; F06921, Sophia-Antipolis Cedex ; France vol. RAN WG1 ,No. Chongqing, China,Oct. 14, 2019-Oct. 20, 2019,Oct. 8, 2019(Oct. 8, 2019) , XP051789613.
NTT Docomo et al:"Offline summary for AI7.1.3.3.4 UL data transmission procedure " , 3GPPDraft ;R1-1803295, 3rd Generation Partnership Project(3GPP) , MobileCompetence Centre ; 650, Route Des Lucioles ; F-06921 Sophia-Antipolis Cedex; France vol. RAN WG1 ,No. Athens, Greece;Feb. 26, 2018-Mar. 2, 2018,Feb. 27, 2018 (Feb. 27, 2018) ,XP051398461.
3GPP, "5G;NR; Physical layer procedures for data (3GPP TS 38.214 version 15.8. 0 Release 15)", ETSI Technical Specification, Europeantelecommunications Standards Ins Titus (ETSI), 650, Route Des Lucioles; F-06921Sop Hia-Antipolis ; France vol. 3GPP RAN, No. V15.8. 0,Jan. 21, 2020(Jan. 21, 2020) , pp. 1-109,XP014360493.
Communication pursuant to Article 94(3) EPC for European Application 20918885.3 mailed Oct. 10, 2023.

\* cited by examiner

DATA TRANSMISSION METHOD AND RELATED DEVICE

CROSS-REFERENCE TO RELATED APPLICATIONS

The present application is a continuation of International Application No. PCT/CN2020/074678 filed on Feb. 10, 2020, which is incorporated herein by reference in its entirety.

TECHNICAL FIELD

The present disclosure relates to communication technology, and more particularly, to a data transmission method and a related apparatus.

BACKGROUND

With the development of wireless communication technology, in both Long Term Evolution (LTE) and New Radio (NR) systems, network deployment on an unlicensed spectrum will be considered, so as to use the unlicensed spectrum to transmit data services. However, in the New Radio-Unlicensed (NR-U) system, transmission resources are to be preempted instead of being allocated deterministically. Therefore, during data transmission in the NR-U system, there are problems of insufficient transmission resources and transmission interruptions.

SUMMARY

Embodiments of the present disclosure provide a data transmission method and a related apparatus, capable of allocating transmission resources in an NR-U system, so as to avoid insufficient transmission resources and transmission interruptions, which is advantageous in ensuring continuous data transmission.

In a first aspect, an embodiment of the present disclosure provides a data transmission method. The method includes: receiving, by a terminal, resource allocation information from a network device; determining, by the terminal, a first transmission resource based on the resource allocation information; and performing, by the terminal, data transmission with the network device over a second transmission resource and/or a third transmission resource in case that the first transmission resource satisfies a predetermined condition. The first transmission resource includes the second transmission resource and the third transmission resource.

In a second aspect, an embodiment of the present disclosure provides a data transmission method. The method includes: transmitting, by a network device, resource allocation information to a terminal, the resource allocation information being used for determining a first transmission resource by the terminal; and receiving, by the network device, a data transmission performed by the terminal over a second transmission resource and/or a third transmission resource in case that the first transmission resource satisfies a predetermined condition. The first transmission resource includes the second transmission resource and the third transmission resource.

In a third aspect, an embodiment of the present disclosure provides a data transmission apparatus, which is applied in a terminal. The apparatus includes a processing unit and a communication unit, and the processing unit is configured to: invoke the communication unit to receive resource allocation information from a network device; determine a first transmission resource based on the resource allocation information; and invoke the communication unit to perform data transmission with the network device over a second transmission resource and/or a third transmission resource in case that the first transmission resource satisfies a predetermined condition, wherein the first transmission resource includes the second transmission resource and the third transmission resource.

In a fourth aspect, an embodiment of the present disclosure provides a data transmission apparatus, which is applied in a network device. The apparatus includes a processing unit and a communication unit, and the processing unit is configured to: invoke the communication unit to transmit resource allocation information to a terminal, for use by the terminal to determine a first transmission resource; and invoke the communication unit to receive a data transmission performed by the terminal over a second transmission resource and/or a third transmission resource in case that the first transmission resource satisfies a predetermined condition. The first transmission resource includes the second transmission resource and the third transmission resource.

In a fifth aspect, an embodiment of the present disclosure provides a terminal. The terminal includes a processor, a memory, a communication interface, and one or more programs. The one or more programs are stored in the memory and configured to be executed by the processor. The one or more programs include instructions for performing the steps in any method in the first aspect of the embodiment of the present disclosure.

In a sixth aspect, an embodiment of the present disclosure provides a network device. The network device includes a processor, a memory, a communication interface, and one or more programs. The one or more programs are stored in the memory and configured to be executed by the processor. The one or more programs include instructions for performing the steps in any method in the second aspect of the embodiment of the present disclosure.

In a seventh aspect, an embodiment of the present disclosure provides a chip. The chip includes a processor configured to invoke and execute a computer program from a memory, to enable a device provided with the chip to perform some or all of the steps in any method in the first aspect or the second aspect of the embodiment of the present disclosure.

In an eighth aspect, an embodiment of the present disclosure provides a computer-readable storage medium. The computer-readable storage medium stores a computer program for electronic data exchange. The computer program causes a computer to perform some or all of the steps in any method in the first aspect or the second aspect of the embodiment of the present disclosure.

In a ninth aspect, an embodiment of the present disclosure provides a computer program. The computer program is operable to cause a computer to perform some or all of the steps in any method in the first aspect or the second aspect of the embodiment of the present disclosure. The computer program may be a software installation package.

It can be seen that, with the embodiments of the present disclosure, a terminal receives resource allocation information from a network device, determines a first transmission resource based on the resource allocation information, and performs data transmission with the network device over a second transmission resource and/or a third transmission resource in case that the first transmission resource satisfies a predetermined condition. The first transmission resource includes the second transmission resource and the third transmission resource. With the present disclosure, transmission resources are allocated in an NR-U system. The terminal can partition the transmission resource determined based on the resource allocation information into two transmission resources, and then perform data transmissions on the two resulting transmission resources, thereby avoiding insufficient transmission resources and transmission interruptions, which is advantageous in ensuring continuous data transmission.

BRIEF DESCRIPTION OF DRAWINGS

The figures to be used in the description of the embodiments or the prior art will be briefly introduced below.

DESCRIPTION OF EMBODIMENTS

The technical solutions in the embodiments of the present disclosure will be described below with reference to the accompanying figures.

Figure 1A:
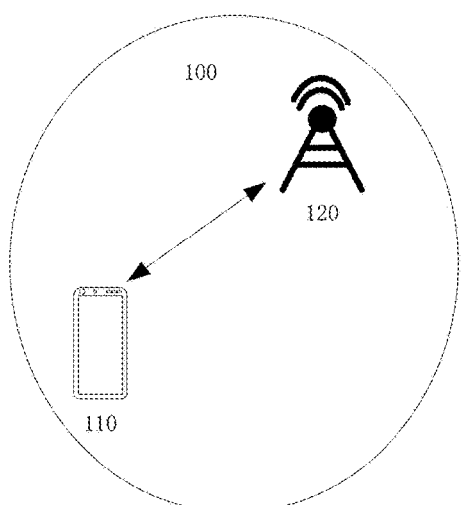
FIG. 1A is a schematic diagram showing a system architecture of an exemplary communication system according to an embodiment of the present disclosure.

The technical solutions of the embodiments of the present disclosure may be applied to the exemplary communication system 100 shown in FIG. 1A. The exemplary communication system 100 includes a terminal 110 and a network device 120. The terminal 110 is communicatively connected to the network device 120.

The exemplary communication system 100 may be, for example, a Non-Terrestrial Network (NTN) system, a Long Term Evolution (LTE) system, an LTE Frequency Division Duplex (FDD) system, an LTE Time Division Duplex (TDD), a $5^{th}$ generation (5G) system, a New Radio (NR) or a future evolved communication system, etc.

The terminal 110 in this embodiment of the present disclosure may refer to a user equipment, an access terminal, a subscriber unit, a subscriber station, a mobile station, a mobile terminal, a remote station, a remote terminal, a mobile device, a user terminal, a terminal, a wireless communication device, a user agent, or a user device. The terminal may be a cellular phone, a cordless phone, a Session Initiation Protocol (SIP) phone, a Wireless Local Loop (WLL) station, a Personal Digital Assistant (PDA), a wireless-enabled handheld device or computing device, or another processing device connected to a wireless modem, a relay device, a vehicle-mounted device, a wearable device, a terminal in a future 5G network, or a terminal in a future evolved Public Land Mobile Network (PLMN), etc. The embodiments of the present disclosure are not limited to any of these examples.

The network device 120 in the embodiment of the present disclosure may be a device for communicating with a terminal. The network device may be an evolved base station, such as an evolved NodeB (eNB or eNodeB) in an LTE system, or a wireless controller in a Cloud Radio Access Network (CRAN) scenario, or the network device can be a relay device, an access point, a vehicle-mounted device, a wearable device, and a network device in a future 5G network, or a network device in a future evolved PLMN network, one or a group (a plurality of) antenna panels of a base station in a 5G system, or a network node that constitutes a gNB or a transmission point, such as a Baseband Unit (BBU) or a Distributed Unit (DU), etc. The embodiment of the present disclosure is not limited to any of these examples.

In some deployments, a gNB may include a Centralized Unit (CU) and a DU. The gNB may also include an Active Antenna Unit (AAU). The CU implements some functions of the gNB, and the DU implements some functions of the gNB. For example, the CU is responsible for processing non-real-time protocols and services, and providing functions at the Radio Resource Control (RRC) and Packet Data Convergence Protocol (PDCP) layers. The DU is responsible for processing physical layer protocols and real-time services, and providing functions at the Radio Link Control (RLC) layer, the Media Access Control (MAC) layer, and the physical (PHY) layer. The AAU implements some physical layer processing functions, radio frequency processing and active antennas related functions. Since information at the RRC layer will eventually become information at the PHY layer, or be transformed from information at the PHY layer, in this architecture, higher-layer signaling, such as RRC layer signaling, can also be considered to be transmitted by the DU, or by DU+AAU. It can be appreciated that the network device may be a device including one or more of a CU node, a DU node, and an AAU node. In addition, the CU may be considered as a network device in an access network (Radio Access Network, or RAN), or the CU may be considered as a network device in a core network (CN), and the present disclosure is not limited to any of these examples.

In an embodiment of the present disclosure, the terminal 110 or the network device 120 may include a hardware layer, an operating system layer running on the hardware layer, and an application layer running on the operating system layer. The hardware layer includes hardware such as a Central Processing Unit (CPU), a Memory Management Unit (MMU), and a memory (also referred to as a main memory). The operating system may be any one or more computer operating systems that implement service processing by processes, such as the Linux operating system, the Unix operating system, the Android operating system, the iOS operating system, or the Windows operating system. The application layer includes applications such as a browser, an address book, word processing software, and instant messaging software. In addition, the embodiments of the present disclosure are not limited to any specific structure of the entity performing the method according to any of the embodiments of the present disclosure, as long as the program that records the codes of the method according to any of the embodiments of the present disclosure can be executed to provide the method according to any of the embodiments of the present disclosure. For example, the entity performing the method according to any of the embodiments of the present disclosure may be a terminal, or a functional module in the terminal that can invoke and execute a program.

An unlicensed spectrum is a spectrum allocated by countries and regions to be used for radio device communication. This spectrum is generally considered to be a shared spectrum, that is, communication devices in different communication systems that can meet regulatory requirements set by the countries or regions on the spectrum can use the spectrum, without having to apply for any exclusive spectrum license from the governments. In order to enable various communication systems that use the unlicensed spectrum for wireless communication to coexist friendly on the spectrum, some countries or regions have stipulated regulatory requirements that must be met when using the unlicensed spectrum. For example, in some regions, communication devices follow the principle of "Listen-Before-Talk (LBT)", that is, before a communication device can transmit a signal on the unlicensed spectrum channel, it needs to perform channel listening first, and only when the channel detection result is that the channel is idle, the communication device can transmit the signal. If the channel detection result for the communication device on the unlicensed spectrum channel is that the channel is busy, the communication device cannot transmit any signal. In order to ensure fairness, in one transmission, the time length of the signal transmission by the communication device using the unlicensed spectrum channel cannot exceed Maximum Channel Occupation Time (MCOT).

Figure 1B:
FIG. 1B is a schematic diagram of a UCI multiplexed in a PUSCH according to an embodiment of the present disclosure.

In order to improve the probability of transmission opportunities, the NR-U system introduces a Configured Grant (CG) transmission mode, in which time-frequency resources are pre-allocated, and Uplink Control Information (UCI), such as HARQ-ID, NDI, RV, and COT-sharing info, is multiplexed on a Physical Uplink Shared Channel (PUSCH), as shown in FIG. 1B.

Figure 1C:
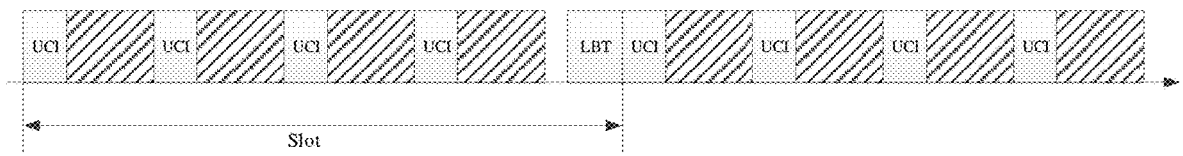
FIG. 1C is a schematic diagram showing a configured grant transmission in an NR-U system according to an embodiment of the present disclosure.

The current configured grant resource allocation does not allow to cross a slot boundary, that is, one PUSCH is transmitted within one slot, as shown in FIG. 1C. However, such restriction may lead to uplink transmission interruption, and accordingly the need to re-preempt resources, or cause problems such as transmission delay.

To avoid transmission interruption, it is considered to remove the restriction and allow transmission across slot boundaries. When a PUSCH crosses slots, it needs to be partitioned, which will cause the length of the PUSCH to be inconsistent with a pre-configured length. However, the length is too short to carry UCI, and without complete UCI, a base station cannot obtain data transmission information and thus cannot demodulate data.

In view of the above problems, an embodiment of the present disclosure provides a data transmission method, which will be described in detail below with reference to the accompanying figures.

Figure 2A:
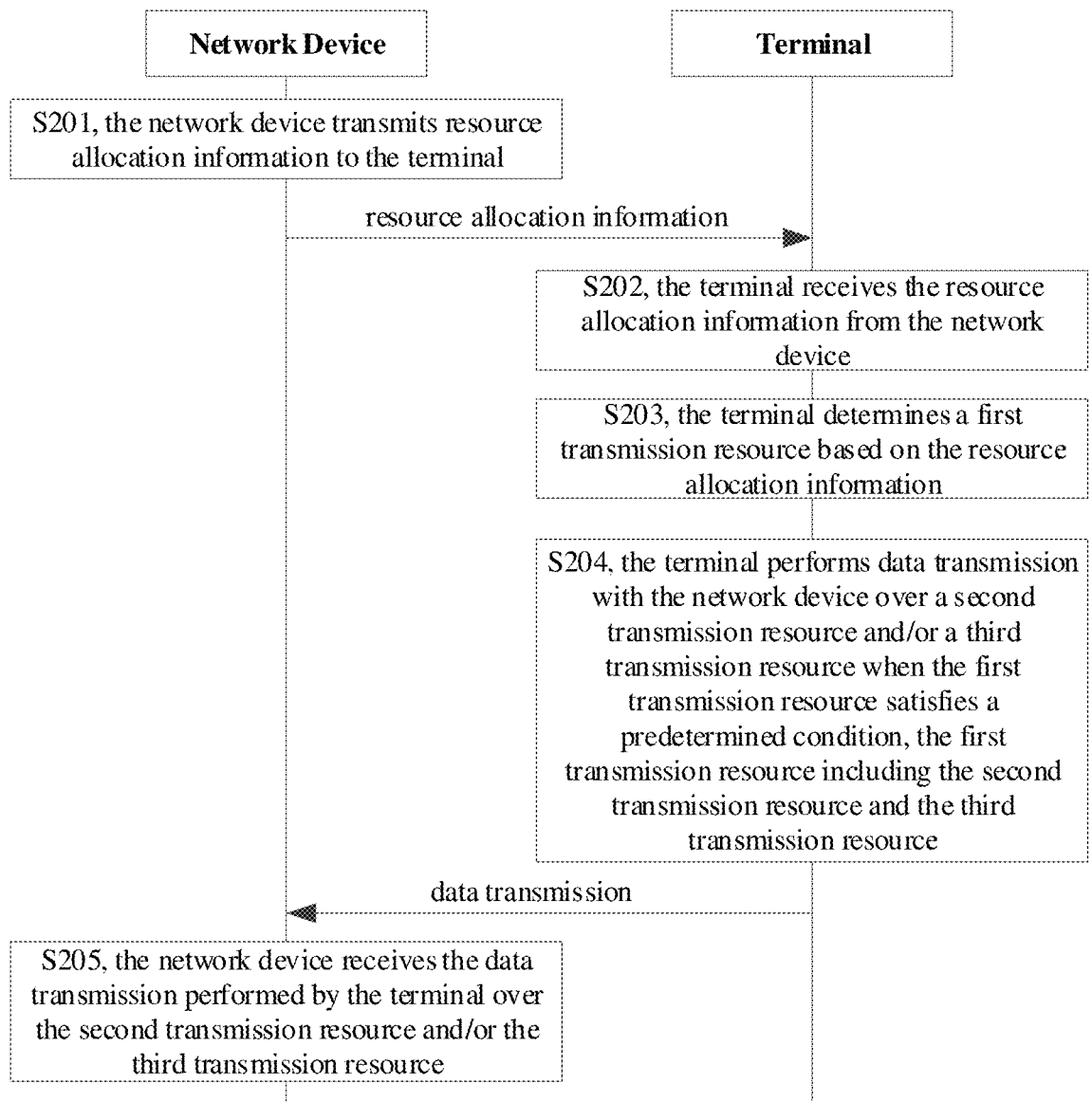
FIG. 2A is a schematic flowchart illustrating a data transmission method according to an embodiment of the present disclosure.

FIG. 2A is a schematic flowchart illustrating a data transmission method according to an embodiment of the present disclosure. As shown, the method includes the following steps.

At S201, a network device transmits resource allocation information to a terminal.

For example, the network device may be a base station in an NR-U system.

Here, the resource allocation information may include resource allocation information for a configured grant and resource allocation information for a Dynamic Grant (DG).

Here, the configured grant corresponds to a configured transmission, and the dynamic grant corresponds to a dynamic transmission.

At S202, the terminal receives the resource allocation information from the network device.

At S203, the terminal determines a first transmission resource based on the resource allocation information.

Here, the first transmission resource may include a time-domain resource and a frequency-domain resource.

For example, the terminal may determine the first transmission resource based on Time-domain Resource Allocation (TDRA) information in Downlink Control Information (DCI) for activating a Type 2 configured grant.

At S204, the terminal performs data transmission with the network device over a second transmission resource and/or a third transmission resource when the first transmission resource satisfies a predetermined condition. The first transmission resource includes the second transmission resource and the third transmission resource.

For example, when the first transmission resource crosses a slot boundary, the terminal may partition the first transmission resource into the second transmission resource and the third transmission resource.

Here, the first transmission resource crossing a slot boundary means that the length of the first transmission resource is greater than one slot.

Here, if the first transmission resource does not satisfy the predetermined condition, the terminal can directly perform data transmission over the first transmission resource.

Here, the second transmission resource and/or the third transmission resource may both carry UCI and data.

For example, after the first transmission resource is partitioned into the second transmission resource and the third transmission resource, when use of only one of the second transmission resource and the third transmission resource is enough to satisfy a data transmission requirement (for example, when the amount of data is limited, one of the second transmission resource and the third transmission resource may be enough for transmission of the data), the UCI and data may be carried on the second transmission resource only and no UCI or data is carried on the third transmission resource, or no UCI or data is carried on the second transmission resource and the UCI and data may be carried on the third transmission resource. When it is needed to use both the second transmission resource and the third transmission resource satisfies the data transmission requirement, the second transmission resource may carry UCI and data, the third transmission resource may also carry UCI and data, and the UCI and data carried on the second transmission resource are different from those carried on the third transmission resource.

At S205, the network device receives the data transmission performed by the terminal over the second transmission resource and/or the third transmission resource.

For example, the network device may receive the UCI and data transmitted by the terminal over the second transmission resource, but may not receive the UCI and data transmitted by the terminal over the third transmission resource. Alternatively, the network device may receive the UCI and data transmitted by the terminal over the third transmission resource, but may not receive the UCI and data transmitted by the terminal over the second transmission resource. Alternatively, the network device may receive the UCI and data transmitted by the terminal over the second transmission resource and the UCI and data transmitted by the terminal over the third transmission resource, the UCI and data carried on the second transmission resource are different from those carried on the third transmission resource, and the UCI and data received on the second transmission resource and the UCI and data received on the third transmission resource are not combined.

It can be seen that, in this embodiment, a terminal receives resource allocation information from a network device, determines a first transmission resource based on the resource allocation information, and performs data transmission with the network device over a second transmission resource and/or a third transmission resource when the first transmission resource satisfies a predetermined condition. The first transmission resource includes the second transmission resource and the third transmission resource. With the present disclosure, transmission resources are allocated in an NR-U system. The terminal can partition the transmission resource determined based on the resource allocation information into two transmission resources, and then perform data transmissions on the two resulting transmission resources, thereby avoiding insufficient transmission resources and transmission interruptions, which is advantageous in ensuring continuous data transmission.

In a possible example, the terminal receiving the resource allocation information from the network device may include: the terminal receiving resource allocation information for a configured grant from the network device; and/or the terminal receiving resource allocation information for a dynamic grant from the network device.

It can be seen that in this example, the resource allocation information can be resource allocation information for a configured grant or resource allocation information for a dynamic grant. That is, the data transmission method can be widely applied to configured transmissions or dynamic transmissions.

In a possible example, the first transmission resource satisfying the predetermined condition may include: the first transmission resource crossing a slot boundary; and/or the first transmission resource being a transmission signal across channels with a high priority.

It can be appreciated that, before the first transmission resource is partitioned, it is required to determine whether to partition it or not based on a determination condition. The determination condition may include a transmission signal across slots and across channels with a high priority, e.g., an uplink Sounding Reference Signal (SRS).

It can be seen that, in this example, various determination conditions can be given to determine whether to partition a transmission resource, which is advantageous to be applied to various types of data transmissions.

In a possible example, the terminal performing the data transmission with the network device over the second transmission resource and/or the third transmission resource may include: when the first transmission resource crosses a slot boundary, the terminal performing the data transmission over the second transmission resource and/or the third transmission resource.

It can be seen that in this example, if the configured grant resource allocation crosses the slot boundary, the terminal may partition the allocated transmission resource, cancel the restriction that the current configured grant resource allocation is not allowed to cross the slot boundary, i.e., the restriction that one PUSCH is transmitted within one slot, so as to avoid uplink transmission interruption, and accordingly the need to re-preempt resources, or problems such as transmission delay.

In a possible example, the terminal performing the data transmission with the network device over the second transmission resource and/or the third transmission resource may include: the terminal determining first data and/or second data based on a first Modulation and Coding Scheme (MCS) and a first time-frequency resource; the terminal determining a second MCS based on the second transmission resource, and/or determining a third MCS based on the third transmission resource; and the terminal transmitting first information with the network device over the second transmission resource according to the second MCS, and/or transmitting second information with the network device over the third transmission resource according to the third MCS. The first information includes the first data, and the second information includes the second data.

Figure 2B:
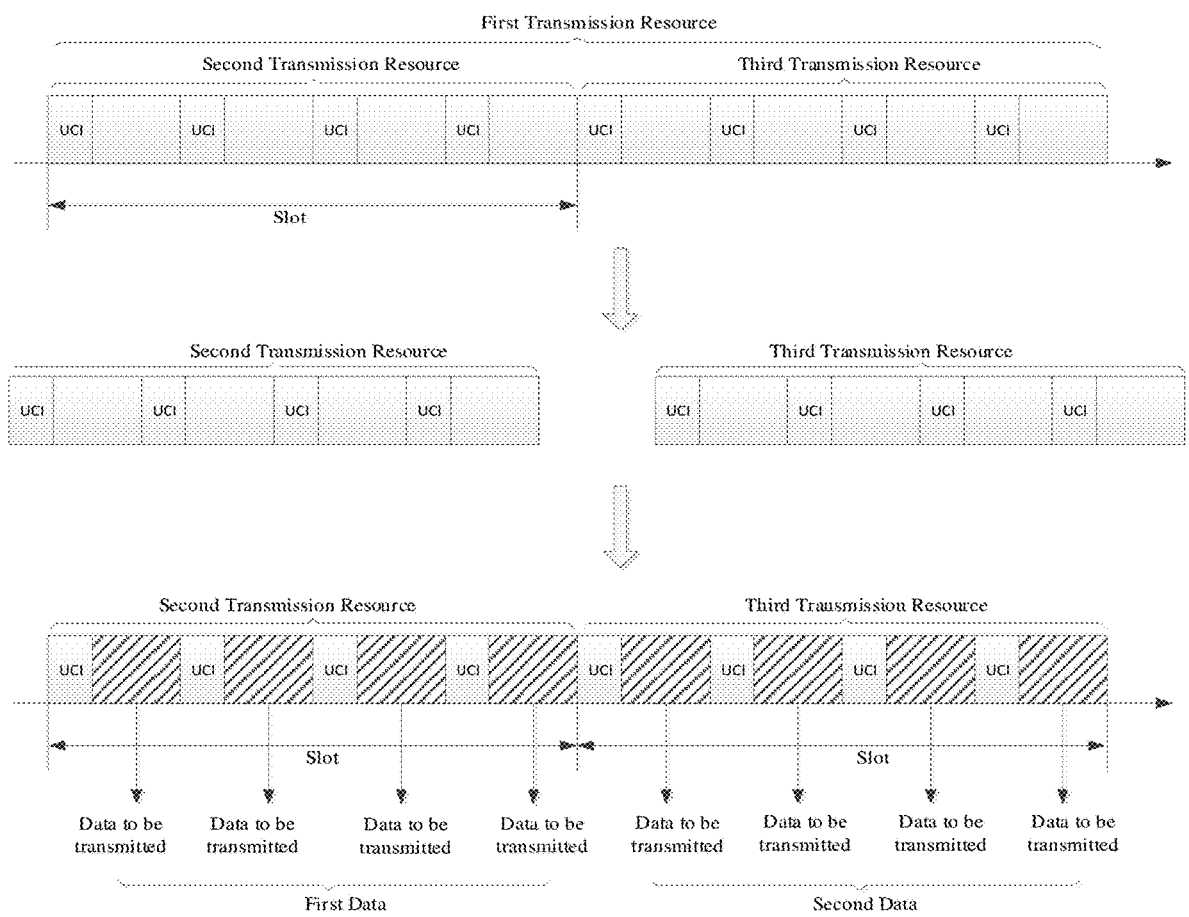
FIG. 2B is a schematic diagram showing another configured grant transmission in an NR-U system according to an embodiment of the present disclosure.

Further referring to FIG. 2B, which is a schematic diagram showing another configured grant transmission in an NR-U system according to an embodiment of the present disclosure, when the first transmission resource determined by the terminal based on the resource allocation information crosses the slot boundary, the first resource can be partitioned into the second transmission resource and the third transmission resource, which are located within one slot, and then the transmission may continue by occupying the resulting second transmission resource and third transmission resource.

Here, as opposed to "no transmission over idle resource", the transmission occupying the resources uses the second transmission resource and the third transmission resource resulted from the partitioning to transmit data, instead of leaving them idle.

Continuing with FIG. 2B, in FIG. 2B, the transmission resource includes UCI and Transport Blocks (TBs) each located between two instances of UCI. After the first transmission resource is partitioned into the second transmission resource and the third transmission resource, the terminal performs transmission by occupying the second transmission resource and the third transmission resource. That is, the data to be transmitted is loaded on all the TBs (the lower left, hatched part in FIG. 2B). In addition, in FIG. 2B, both the second transmission resource and the third transmission resource carry different UCI and data. The first data includes all the data to be transmitted in the second transmission resource, and the second data includes all the data to be transmitted in the third transmission resource. The first information includes the first data and all UCI in the second transmission resource, and the second information includes the second data and all UCI in the third transmission resource. Here, the UCI in the second transmission resource is different from the UCI in the third transmission resource.

Here, the first MCS and the first time-frequency resource may be pre-configured, for example, pre-configured by the network device.

For example, for the first data and/or the second data, the terminal may determine the TBs based on the preconfigured first MCS and the resource configuration (including preconfigured time-domain resource and frequency-domain resource), and determine the MCS based on the second transmission resource and/or the third transmission resource.

It can be appreciated that the transmissions on the second transmission resource and/or the third transmission resource may be independent from each other. That is, the content transmitted by the terminal on the second transmission resource and the content transmitted by the terminal on the third transmission resource may be independent from each other.

Here, the transmission resources may mainly refer to time-domain resources.

It can be seen that in this example, the terminal may continue the transmission by occupying the transmission resources resulted from the partitioning, such that the complexity of data transmission can be relatively low.

In a possible example, the first information and the second information may further include UCI.

It can be appreciated that, in the configured grant transmission mode, the UCI is multiplexed in the PUSCH, and thus the first information and the second information each include the UCI in addition to the data to be transmitted.

Here, the UCI included in the first information and the UCI included in the second information may be different.

In a possible example, the method may further include: determining, by the terminal, a transmission resource occupied by the UCI based on the first time-frequency resource, the first MCS, and a $\beta$ offset.

Here, the first time-frequency resource, the first MCS, and the $\beta$ offset (betaoffset) may be pre-configured, for example, pre-configured by the network device.

It can be seen that, in this example, the proposed scheme for determining the UCI transmission resource can be adapted to various PUSCH lengths.

In a possible example, the configured grant may be a Type 1 configured grant, and the first time-frequency resource, the first MCS, and the $\beta$ offset may be configured by Radio Resource Control (RRC) information.

Here, for the Type 1 configured grant, the pre-configured time-frequency resource (i.e., the first time-frequency resource), the pre-configured MCS (i.e., the first MCS), and the pre-configured betaoffset (i.e., the $\beta$ offset) may be configured by Radio Resource Control (RRC) information.

In a possible example, the configured grant may be a Type 2 configured grant, the first time-frequency resource and the first MCS may be configured by Downlink Control Information (DCI) for activating the Type 2 configured grant, and the $\beta$ offset may be configured by Radio Resource Control (RRC) information or the DCI for activating the Type 2 configured grant.

Here, for the Type 2 configured grant, the preconfigured time-frequency resource (i.e., the first time-frequency resource) and the preconfigured MCS (i.e., the first MCS) may be configured by the DCI for activating the Type 2 configured grant transmission, and the preconfigured betaoffset may be configured by RRC information or the DCI for activating the Type 2 configured grant transmission.

In a possible example, the data transmission may be a dynamic grant, the first time-frequency resource and the first MCS may be configured by Downlink Control Information (DCI) for scheduling the dynamic grant, and the $\beta$ offset may be configured by Radio Resource Control (RRC) information or the DCI for scheduling the dynamic grant.

In a possible example, the method may further include: determining, by the terminal, a transmission resource occupied by the UCI based on a $\beta$ offset, the second MCS and the second time-frequency resource; and/or determining, by the terminal, the transmission resource occupied by the UCI based on the $\beta$ offset, the third MCS and the third time-frequency resource.

Here, the $\beta$ offset (betaoffset) may be pre-configured, for example, pre-configured by the network device. The second MCS is the actual MCS, and the second time-frequency resource is the actual time-frequency resource, such as the second transmission resource. The third MCS is the actual MCS, and the third time-frequency resource is the actual time-frequency resource, such as the third transmission resource.

It can be seen that, in this example, the proposed method for determining the UCI transmission resource can be adapted to various PUSCH lengths.

In a possible example, the $\beta$ offset may be configured by Radio Resource Control (RRC) information or Downlink Control Information (DCI) for activating a Type 2 configured grant.

Here, for the Type 1/Type 2 configured grant, the betaoffset may be configured by RRC information.

In a possible example, the method may further include: determining, by the terminal, the second MCS and the second time-frequency resource by means of resource partitioning based on the first MCS and the first time-frequency resource; and/or determining, by the terminal, the third MCS and the third time-frequency resource by means of resource partitioning based on the first MCS and the first time-frequency resource.

Here, the actual MCS and the actual time-frequency resource may be obtained and calculated by partitioning the pre-configured MCS and the pre-configured time-frequency resource. Specifically, if the transmission resource determined based on the resource allocation information is a certain multiple of the actual transmission resource, the actual MCS is the multiple of the preconfigured MCS.

For example, when the actual resource resulted from the partitioning is reduced to ½ of the pre-allocated resource, the code rate of the actual MCS can be twice the code rate of the pre-configured MCS. For example, if the second transmission resource is reduced to ½ of the first transmission resource, that is, the first transmission resource is twice the second transmission resource, the second MCS may be twice the first MCS.

In a possible example, the terminal performing the data transmission with the network device over the second transmission resource and/or the third transmission resource may include: performing the data transmission with the network device over a fourth transmission resource and/or a fifth transmission resource, the fourth transmission resource including at least the second transmission resource, and the fifth transmission resource including at least the third transmission resource.

Here, in a combination mode, the second transmission resource and the previous transmission resource adjacent to the second transmission resource may be combined to form the fourth transmission resource, and the third transmission resource and the subsequent transmission resource adjacent to the third transmission resource may be combined to form the fifth transmission resource.

Here, the terminal may perform independent transmissions on the fourth transmission resource and the fifth transmission resource.

Figure 2C:
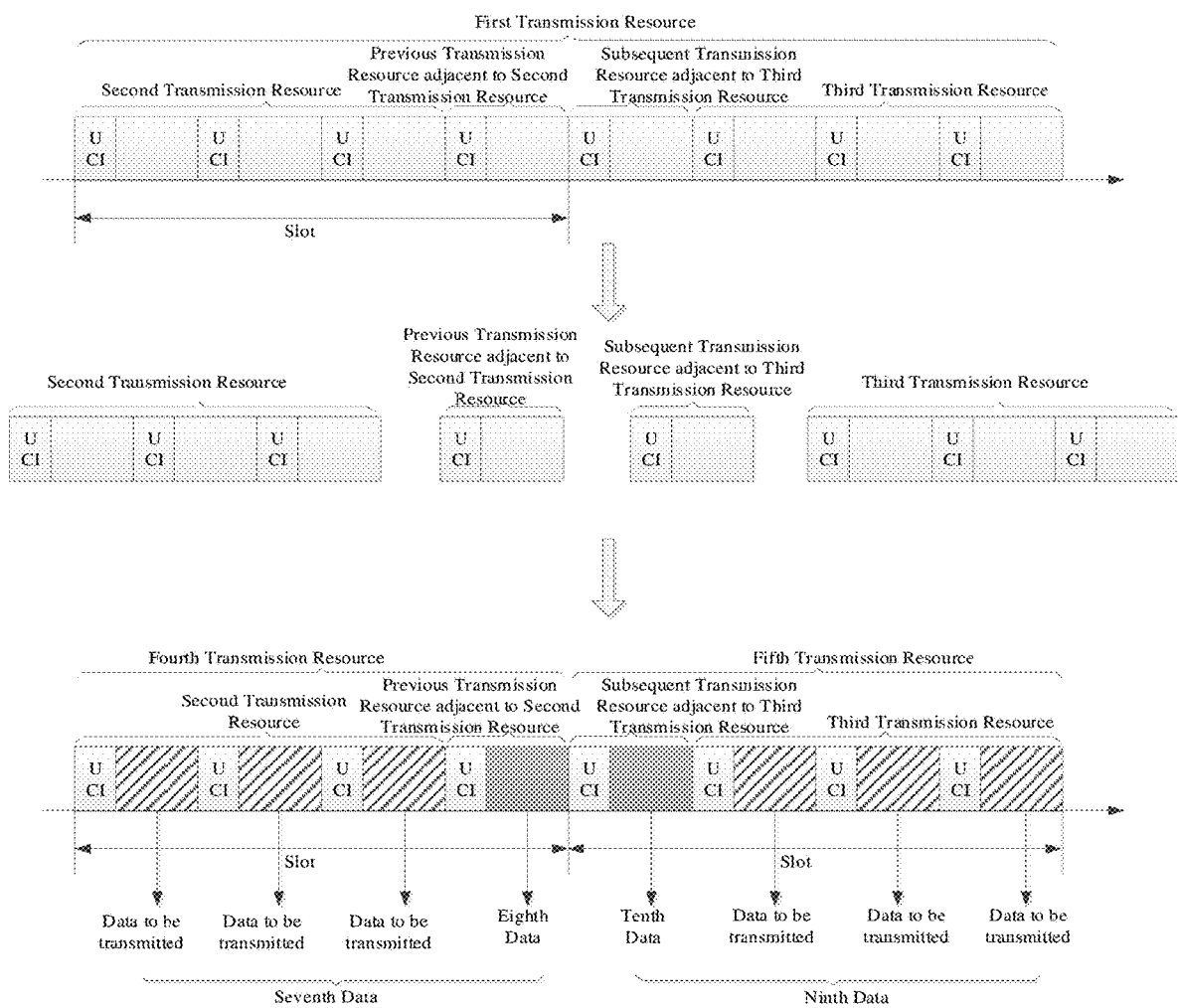
FIG. 2C is a schematic diagram showing yet another configured grant transmission in an NR-U system according to an embodiment of the present disclosure.

Further referring to FIG. 2C, which is a schematic diagram showing another configured grant transmission in an NR-U system according to an embodiment of the present disclosure. The first resource is partitioned into the second transmission resource and the third transmission resource, the resulting second and third transmission resources are combined with adjacent transmission resources into two new transmission resources, respectively, and independent transmissions are performed on the new combined transmission resources. FIG. 2C is a schematic diagram showing combination of the second transmission resource and the third transmission resource with their respective adjacent transmission resources. The first transmission resource includes the second transmission resource, the previous transmission resource adjacent to the second transmission resource, the third transmission resource, and the subsequent transmission resource adjacent to the third transmission resource. That is, the first transmission resource is partitioned into the above four transmission resources. The second transmission resource is combined with the previous transmission resource adjacent to the second transmission resource to form the fourth transmission resource, the third transmission resource is combined with the subsequent transmission resource adjacent to the third transmission resource to form the fifth transmission resource, and the fourth transmission resource and the fifth transmission resource are located within one slot. The fourth transmission resource and the fifth transmission resource carry different UCI and data.

In addition, it is to be pointed out that the previous transmission resource adjacent to the second transmission resource and the subsequent transmission resource adjacent to the third transmission resource may be the same transmission resource. That is, the first transmission resource is partitioned into three transmission resources, i.e., the second transmission resource, the third transmission resource, and the previous transmission resource adjacent to the second transmission resource or the subsequent transmission resource adjacent to the third transmission resource.

Continuing with FIG. 2C, in FIG. 2C, seventh data and UCI are carried on the fourth transmission resource, the seventh data includes the data to be transmitted on the second transmission resource and eighth data. The TBs on the second transmission resource carry the data to be transmitted, and the previous transmission resource adjacent to the second transmission resource carries the eighth data (that is, the data to be transmitted on the previous transmission resource adjacent to the second transmission resource). Ninth data and UCI are carried on the fifth transmission resource, and the ninth data includes the data to be transmitted on the third transmission resource and tenth data. The TBs on the third transmission resource carries the data to be transmitted, the subsequent transmission resource adjacent to the third transmission resource carries the tenth data (that is, the data to be transmitted on the subsequent transmission resource adjacent to the third transmission resource).

It can be seen that in this example, after the first transmission resource is partitioned, the resulting second transmission resource and third transmission resource are combined with their respective adjacent transmission resources into new transmission resources, and then independent transmissions are performed on the new transmission resources, which is advantageous in fully utilizing resources and improving transmission efficiency.

In a possible example, a code rate used for the data transmitted over the second transmission resource may be greater than a predetermined threshold, and the fourth transmission resource may further include a previous transmission resource adjacent to the second transmission resource.

For example, if the code rate used for the data transmitted over the second transmission resource is greater than the threshold, the second transmission resource and its adjacent transmission resource may be combined to form the fourth transmission resource; or otherwise, the second transmission resource may be used as the fourth transmission resource.

Figure 2D:
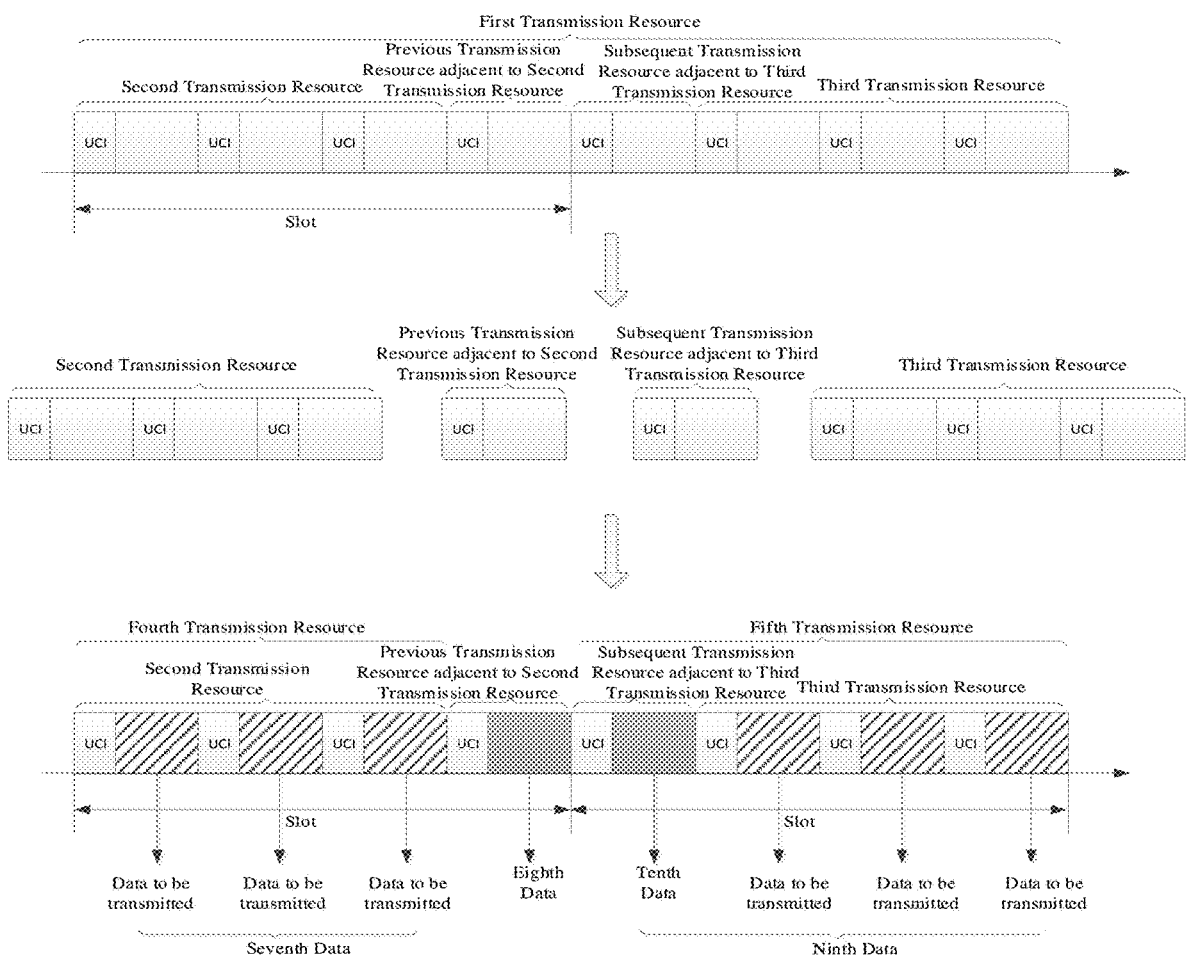
FIG. 2D is a schematic diagram showing still another configured grant transmission in an NR-U system according to an embodiment of the present disclosure.

Further referring to FIG. 2D, which is a schematic diagram showing another configured grant transmission in an NR-U system according to an embodiment of the present disclosure, its difference from FIG. 2C is that the code rate used for the data transmitted over the second transmission resource is not greater than the predetermined threshold, and thus the second transmission resource is directly used as the fourth transmission resource. In this case, the seventh data and the UCI are carried on the fourth transmission resource, and the seventh data includes only the data to be transmitted on the second transmission resource.

In a possible example, a code rate used for the data transmitted over the third transmission resource may be greater than the predetermined threshold, and the fifth transmission resource may further include a subsequent transmission resource adjacent to the third transmission resource.

For example, if the code rate used for the data transmitted over the third transmission resource is greater than the threshold, the third transmission resource and its adjacent transmission resource may be combined to form the fifth transmission resource; or otherwise, the third transmission resource may be used as the fifth transmission resource.

Figure 2E:
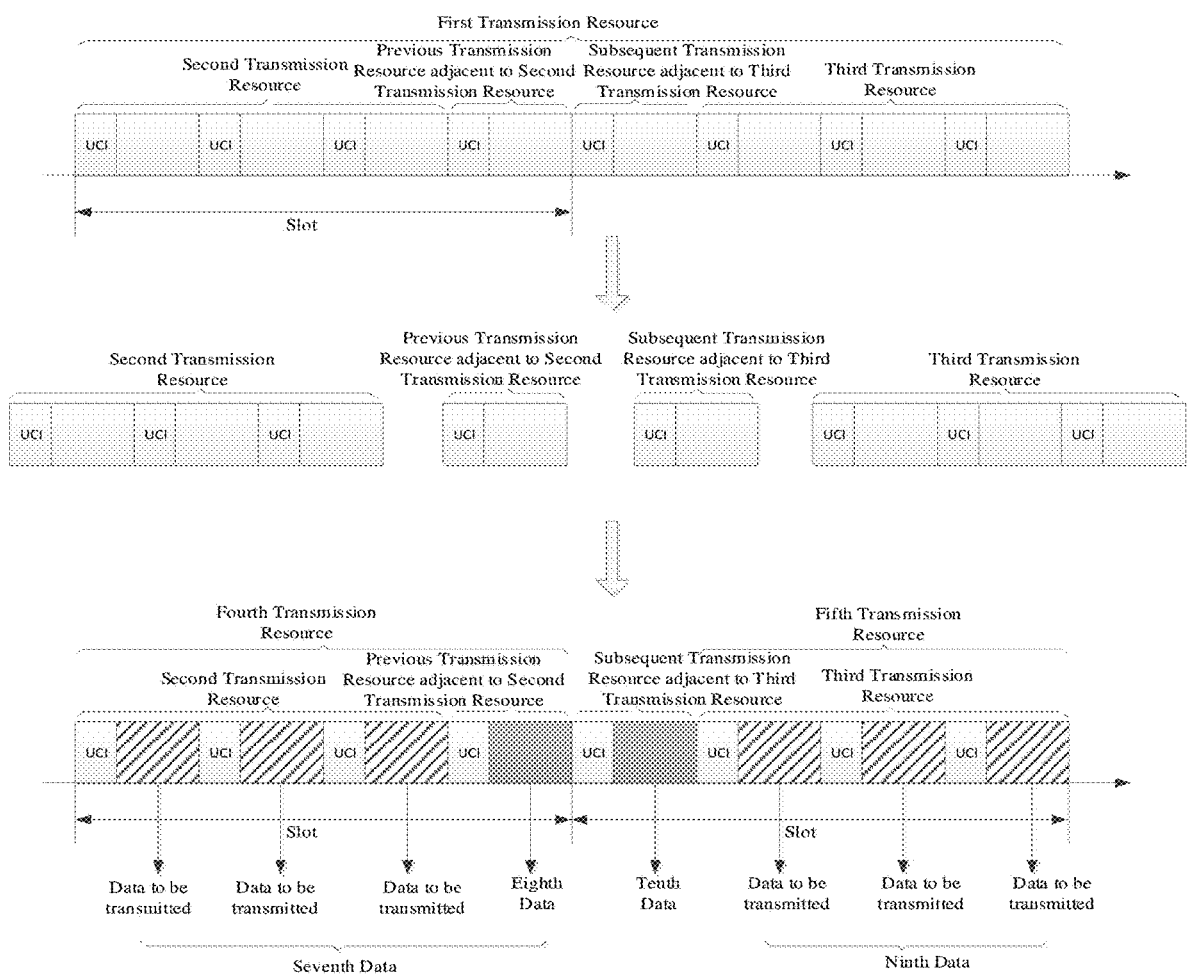
FIG. 2E is a schematic diagram showing still yet another configured grant transmission in an NR-U system according to an embodiment of the present disclosure.

Further referring to FIG. 2E, which is a schematic diagram showing another configured grant transmission in an NR-U system according to an embodiment of the present disclosure, its difference from FIG. 2C is that the code rate used for the data transmitted over the third transmission resource is not greater than the predetermined threshold, and thus the third transmission resource is directly used as the fifth transmission resource. The ninth data and the UCI are carried on the fifth transmission resource, and the ninth data only includes the data to be transmitted on the third transmission resource.

In a possible example, the terminal performing the data transmission with the network device over the second transmission resource and/or the third transmission resource may include: the terminal transmitting third data to the network device over the second transmission resource, the third data including part or all of fourth data, which is transmitted over a previous transmission resource adjacent to the second transmission resource; and/or the terminal transmitting fifth data to the network device over the third transmission resource, the fifth data including part or all of sixth data, which is transmitted over a subsequent transmission resource adjacent to the third transmission resource.

Figure 2F:
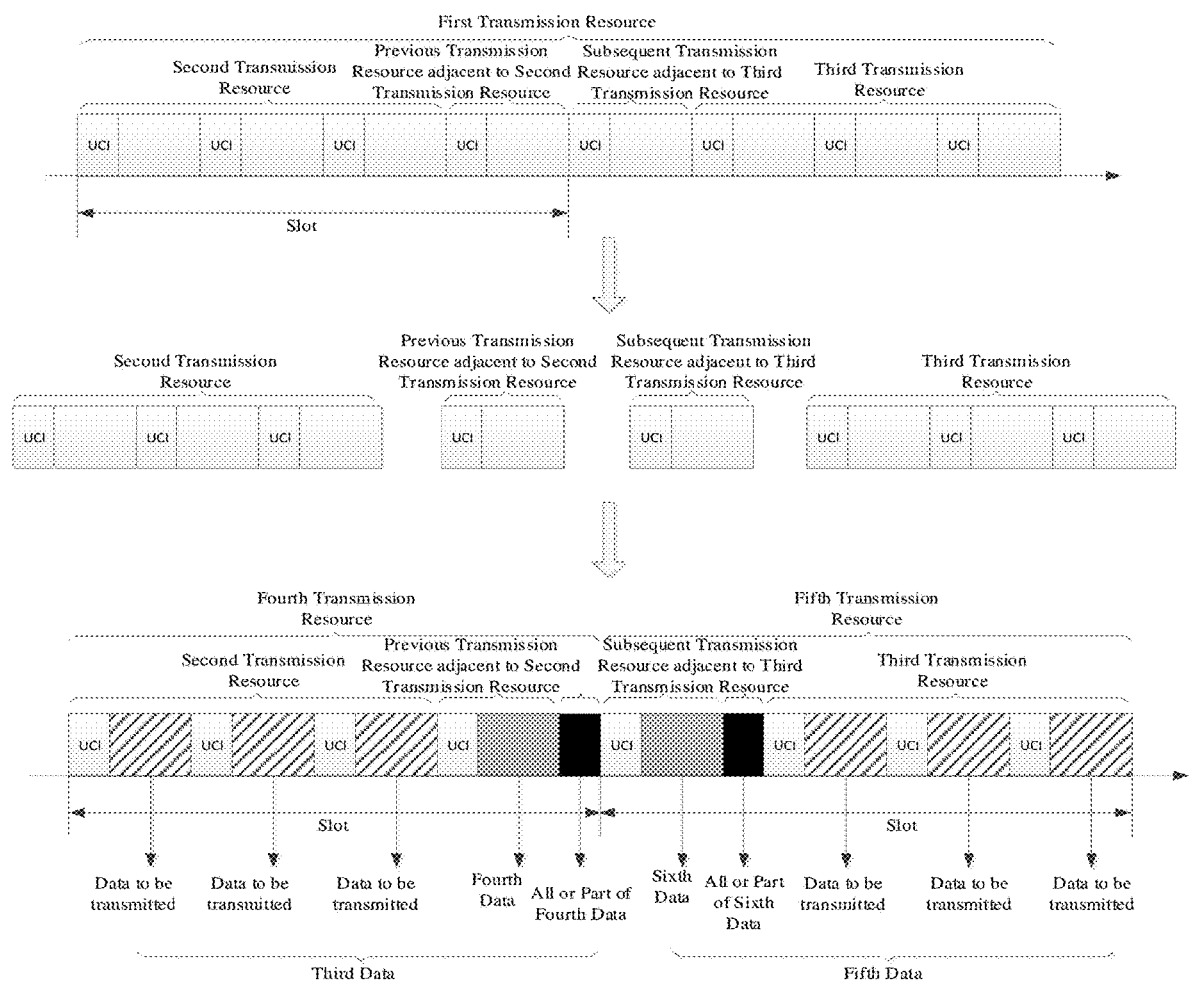
FIG. 2F is a schematic diagram showing a further configured grant transmission in an NR-U system according to an embodiment of the present disclosure.

Further referring to FIG. 2F, which is a schematic diagram showing another configured grant transmission in an NR-U system according to an embodiment of the present disclosure, its difference from FIG. 2C is that the second transmission resource and the third transmission resource are not combined with their respective adjacent resources, but the transmitted content is a repetition of the content transmitted on the adjacent transmission resources. That is, when the first transmission resource determined by the terminal based on the resource allocation information crosses a slot boundary, the first resource is partitioned into the second transmission resource and the third transmission resource. The data transmitted over the second transmission resource includes all or part of the data transmitted over its adjacent transmission resource, and the data transmitted over the third transmission resource also includes all or part of the data transmitted over its adjacent transmission resource. FIG. 2F is a schematic diagram showing all or part of the data transmitted over the second transmission resource, the third transmission resource and their respective adjacent transmission resources. The data in each black parts in FIG. 2F is a repetition of the data in its adjacent gray part. For example, the data in each black part in FIG. 2F is the same as the data in its adjacent gray part. For example, the gray part has 7 symbols of data, and the black part also has the data of these 7 symbols. Alternatively, in FIG. 2F, the data of each black part is a part of the data of its adjacent gray part. For example, the data of the gray part has 7 symbols, and the black part has the data of the first two of the 7 symbols.

Here, the second transmission resource and the third transmission resource are used for repetition of the content transmitted on their respective adjacent transmissions, and thus the content on the second transmission resource and the content on the third transmission resource are different. However, when the previous transmission resource adjacent to the second transmission resource is the same as the subsequent transmission resource adjacent to the third transmission resource, the UCI and/or the data may be partially the same, depending on the repetition position. The repetition position may be the first L symbols, the last L symbols, or the middle L symbols of the adjacent resources.

Continuing with FIG. 2F, in FIG. 2F, the third data and the UCI are carried on the fourth transmission resource, the third data includes the data to be transmitted on the second transmission resource and part or all of the fourth data. Here, the TBs of the second transmission resource carry the data to be transmitted, and the previous transmission resource adjacent to the second transmission resource carries the fourth data (i.e., the data to be transmitted on the previous transmission resource adjacent to the second transmission resource). The fifth data and the UCI are carried on the fifth transmission resource, and the fifth data includes the data to be transmitted on the third transmission resource and part or all of the sixth data. Here, the TBs of the third transmission resource carry the data to be transmitted, and the subsequent transmission resource adjacent to the third transmission resource carries the sixth data (i.e., the data to be transmitted on the subsequent transmission resource adjacent to the third transmission resource).

In addition, it is to be pointed out that FIG. 2F shows that the third data carried on the fourth transmission resource includes part or all of the fourth data, and the fifth data carried on the fifth transmission resource includes part or all of the fourth data. This is only an example. Alternatively, the third data carried on the fourth transmission resource may include part or all of the fourth data, and the fifth data carried on the fifth transmission resource may not include part or all of the fourth data, or the third data carried on the fourth transmission resource may not include part or all of the fourth data, and the fifth data carried on the fifth transmission resource may include part or all of the fourth data.

It can be seen that in this example, after the first transmission resource is partitioned, the resulting second transmission resource and third transmission resource can be used to transmit the data transmitted on their respective adjacent transmission resources, i.e., to repeat the data transmitted on the adjacent transmission resources, such that the data transmission can be simple, and the allocated transmission resources can be utilized as much as possible.

In a possible example, if the second transmission resource or the third transmission resource has no adjacent transmission resource in a slot where it is located, the terminal does not perform data transmission with the network device over the second transmission resource or the third transmission resource.

For example, if the second transmission resource has no adjacent previous transmission resource, the terminal does not perform data transmission with the network device over the second transmission resource. If the third transmission resource has no adjacent subsequent transmission resource, the terminal does not perform data transmission with the network device over the third transmission resource.

In a possible example, the terminal determining the first transmission resource based on the resource allocation information may include: the terminal determining the first transmission resource according to time-domain resource allocation information in Downlink Control Information (DCI) for activating a Type 2 configured grant, the resource allocation information including the time-domain resource allocation information in the DCI for activating the Type 2 configured grant.

The resource allocation information may include time-domain resource allocation information and frequency-domain resource allocation information.

For example, the terminal may determine the first transmission resource based on Time-domain Resource Allocation (TDRA) information in Downlink Control Information (DCI) for activating the Type 2 configured grant.

It can be seen that in this example, the terminal can determine the transmission resource for data transmission based on any of various resource allocation information, which is advantageous in improving the efficiency of data transmission.

In a possible example, the data transmission may be performed in a network on an unlicensed spectrum.

Here, the data transmission method can be applied to pre-scheduled transmissions, e.g., Configured Grant and SPS; and dynamically scheduled transmissions, e.g., PDSCH/PUSCH scheduled by DL grant/UL grant.

In addition, the data transmission method can be applied to uplink transmissions, such as PUSCH, and downlink transmissions, such as PDSCH.

The solutions of the embodiments of the present disclosure have been introduced above from the perspective of methods, e.g., interactions between various network elements. It can be appreciated that, in order to implement the above functions, the terminal and the network device may include corresponding hardware structures and/or software modules for performing the respective functions. It can be appreciated by those skilled in the art that the present disclosure can be implemented in hardware or any combination of hardware and computer software, given the units and algorithm steps in each example described in conjunction with the embodiments disclosed herein. Whether a function is performed by hardware or computer software driving hardware depends on specific applications and design constraints of the technical solutions. Those skilled in the art may implement the described functionality using different methods for each particular application, and such implementations are to be encompassed by the scope of the present disclosure.

In the embodiment of the present disclosure, the terminal and the network device may be divided into functional units according to the above exemplary methods. For example, one functional unit may be provided for each function, or two or more functions may be integrated into one processing unit. The above integrated unit can be implemented in the form of hardware, or in the form of software program modules. It is to be noted that the division of units in the embodiments of the present disclosure is illustrative, and is only a logical function division, and other divisions may be used in actual implementations.

Figure 3:
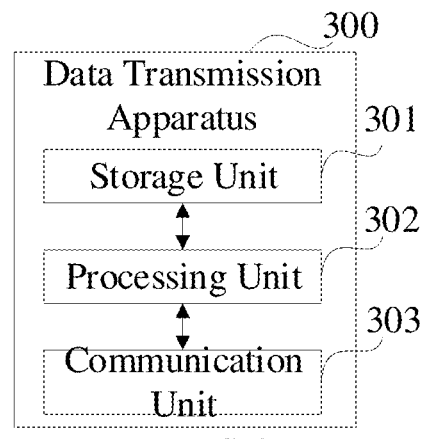
FIG. 3 is a block diagram showing functional units of a data transmission apparatus according to an embodiment of the present disclosure.

When integrated units are used, FIG. 3 shows a block diagram of functional units of a data transmission apparatus. The data transmission apparatus 300 is applied to a terminal, and specifically includes a processing unit 302 and a communication unit 303. The processing unit 302 is configured to control and manage actions of the terminal, e.g., the processing unit 302 is configured to enable the terminal to perform the steps 202-204 in FIG. 2A and other processes as described herein. The communication unit 303 is configured to enable communication between the terminal and other devices. The terminal may further include a storage unit 301 for storing program codes and data of the terminal.

The processing unit 302 may be a processor or a controller, such as a Central Processing Unit (CPU), a general-purpose processor, a Digital Signal Processor (DSP), an Application-Specific Integrated Circuit (ASIC), a Field Programmable Gate Array (FPGA), or any other programmable logic device, transistor logic device, hardware component, or any combination thereof. It may implement or execute the exemplary logical blocks, modules and circuits described in connection with the present disclosure. The processor may also implement a combination of computing functions, e.g., including a combination of one or more microprocessors, a combination of a DSP and a microprocessor, and the like. The communication unit 303 may be a communication interface, a transceiver, a transceiver circuit, etc., and the storage unit 301 may be a memory. When the processing unit 302 is a processor, the communication unit 303 is a communication interface, and the storage unit 301 is a memory, the terminal involved in this embodiment of the present disclosure may be the terminal shown in FIG. 3.

In a specific implementation, the processing unit 302 is configured to perform any step performed by the terminal in the above method embodiments, and when performing data transmission such as transmitting data, the communication unit 303 can be selectively invoked to complete the corresponding operation. A detailed description will be given below.

The processing unit 302 is configured to: invoke the communication unit 303 to receive resource allocation information from a network device; determine a first transmission resource based on the resource allocation information; and invoke the communication unit 303 to perform data transmission with the network device over a second transmission resource and/or a third transmission resource when the first transmission resource satisfies a predetermined condition. The first transmission resource includes the second transmission resource and the third transmission resource.

It can be seen that, in this embodiment, a terminal receives resource allocation information from a network device, determines a first transmission resource based on the resource allocation information, and performs data transmission with the network device over a second transmission resource and/or a third transmission resource when the first transmission resource satisfies a predetermined condition. The first transmission resource includes the second transmission resource and the third transmission resource. With the present disclosure, transmission resources are allocated in an NR-U system. The terminal can partition the transmission resource determined based on the resource allocation information into two transmission resources, and then perform data transmissions on the two resulting transmission resources, thereby avoiding insufficient transmission resources and transmission interruptions, which is advantageous in ensuring continuous data transmission.

In a possible example, the operation of receiving the resource allocation information from the network device may include: receiving resource allocation information for a configured grant from the network device; and/or receiving resource allocation information for a dynamic grant from the network device.

In a possible example, the first transmission resource satisfying the predetermined condition may include: the first transmission resource crossing a slot boundary; and/or the first transmission resource being a transmission signal across channels with a high priority.

In a possible example, in performing the data transmission with the network device over the second transmission resource and/or the third transmission resource, the processing unit 302 may be configured to: determine first data and/or second data based on a first Modulation and Coding Scheme (MCS) and a first time-frequency resource; determine a second MCS based on the second transmission resource, and/or determine a third MCS based on the third transmission resource; and invoke the communication unit 303 to transmit first information with the network device over the second transmission resource according to the second MCS, and/or transmit second information with the network device over the third transmission resource according to the third MCS, the first information including the first data, and the second information including the second data.

In a possible example, the first information and the second information may further include Uplink Control Information (UCI).

In a possible example, the processing unit 302 may be further configured to: determine a transmission resource occupied by the UCI based on the first time-frequency resource, the first MCS, and a β offset.

In a possible example, the configured grant may be a Type 1 configured grant, and the first time-frequency resource, the first MCS, and the β offset may be configured by Radio Resource Control (RRC) information.

In a possible example, the configured grant may be a Type 2 configured grant, the first time-frequency resource and the first MCS may be configured by Downlink Control Information (DCI) for activating the Type 2 configured grant, and the β offset may be configured by Radio Resource Control (RRC) information or the DCI for activating the Type 2 configured grant.

In a possible example, the data transmission may be a dynamic grant, the first time-frequency resource and the first MCS may be configured by Downlink Control Information (DCI) for scheduling the dynamic grant, and the β offset may be configured by Radio Resource Control (RRC) information or the DCI for scheduling the dynamic grant.

In a possible example, the processing unit 302 may be further configured to: determine a transmission resource occupied by the UCI based on a β offset, the second MCS and the second time-frequency resource; and/or determine the transmission resource occupied by the UCI based on the β offset, the third MCS and the third time-frequency resource.

In a possible example, the β offset may be configured by Radio Resource Control (RRC) information or Downlink Control Information (DCI) for activating a Type 2 configured grant.

In a possible example, the processing unit 302 may be further configured to: determine the second MCS and the second time-frequency resource by means of resource partitioning based on the first MCS and the first time-frequency resource; and/or determine the third MCS and the third time-frequency resource by means of resource partitioning based on the first MCS and the first time-frequency resource.

In a possible example, in performing the data transmission with the network device over the second transmission resource and/or the third transmission resource, the processing unit 302 may be configured to: invoke the communication unit 303 to perform the data transmission with the network device over a fourth transmission resource and/or a fifth transmission resource, the fourth transmission resource including at least the second transmission resource, and the fifth transmission resource including at least the third transmission resource.

In a possible example, a code rate used for the data transmitted over the second transmission resource is greater than a predetermined threshold; and the fourth transmission resource further includes a previous transmission resource adjacent to the second transmission resource.

In a possible example, a code rate used for the data transmitted over the third transmission resource is greater than the predetermined threshold; and the fifth transmission resource further includes a subsequent transmission resource adjacent to the third transmission resource.

In a possible example, in performing the data transmission with the network device over the second transmission resource and/or the third transmission resource, the processing unit 302 may be configured to: invoke the communication unit 303 to transmit third data to the network device over the second transmission resource, the third data including part or all of fourth data, which is transmitted over a previous transmission resource adjacent to the second transmission resource; and/or invoke the communication unit 303 to transmit fifth data to the network device over the third transmission resource, the fifth data including part or all of sixth data, which is transmitted over a subsequent transmission resource adjacent to the third transmission resource.

In a possible example, if the second transmission resource or the third transmission resource has no adjacent transmission resource in a slot where it is located, no data transmission may be performed with the network device over the second transmission resource or the third transmission resource.

In a possible example, in determining the first transmission resource based on the resource allocation information, the processing unit 302 may be configured to: determine the first transmission resource according to time-domain resource allocation information in Downlink Control Information (DCI) for activating a Type 2 configured grant, the resource allocation information including the time-domain resource allocation information in the DCI for activating the Type 2 configured grant.

In a possible example, the data transmission may be performed in a network on an unlicensed spectrum.

Figure 4:
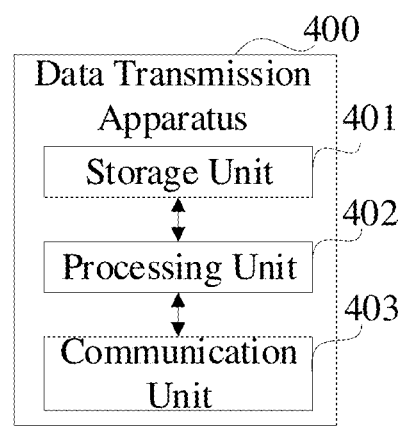
FIG. 4 is a block diagram showing functional units of another data transmission apparatus according to an embodiment of the present disclosure.

When integrated units are used, FIG. 4 shows a block diagram of functional units of another data transmission apparatus. The data transmission apparatus 400 is applied to a network device, and the network device includes a processing unit 402 and a communication unit 403. The processing unit 402 is configured to control and manage actions of the network device, e.g., the processing unit 502 is configured to enable the network device to perform the steps 201 and 205 in FIG. 2A and/or other processes as described herein. The communication unit 403 is configured to enable communication between the network device and other devices. The network device may further include a storage unit 401 for storing program codes and data of the terminal.

The processing unit 402 may be a processor or a controller, such as a Central Processing Unit (CPU), a general-purpose processor, a Digital Signal Processor (DSP), an Application-Specific Integrated Circuit (ASIC), a Field Programmable Gate Array (FPGA), or any other programmable logic device, transistor logic device, hardware component, or any combination thereof. It may implement or execute the exemplary logical blocks, modules and circuits described in connection with the present disclosure. The processor may also implement a combination of computing functions, e.g., including a combination of one or more microprocessors, a combination of a DSP and a microprocessor, and the like. The communication unit 403 may be a communication interface, a transceiver, a transceiver circuit, etc., and the storage unit 401 may be a memory. When the processing unit 402 is a processor, the communication unit 403 is a communication interface, and the storage unit 401 is a memory, the terminal involved in this embodiment of the present disclosure may be the network device shown in FIG. 4.

The processing unit 402 is configured to invoke the communication unit 403 to transmit resource allocation information to a terminal, for use by the terminal to determine a first transmission resource; and invoke the communication unit 403 to receive a data transmission performed by the terminal over a second transmission resource and/or a third transmission resource when the first transmission resource satisfies a predetermined condition, wherein the first transmission resource includes the second transmission resource and the third transmission resource.

It can be seen that, in this embodiment, a network device transmits resource allocation information to a terminal, for use by the terminal to determine a first transmission resource. The network device receives a data transmission performed by the terminal over a second transmission resource and/or a third transmission resource when the first transmission resource satisfies a predetermined condition. The first transmission resource includes the second transmission resource and the third transmission resource. With the present disclosure, transmission resources are allocated in an NR-U system. The network device transmits the resource allocation information to the terminal. The terminal can partition the transmission resource determined based on the resource allocation information into two transmission resources, and then perform data transmissions on the two resulting transmission resources, thereby avoiding insufficient transmission resources and transmission interruptions, which is advantageous in ensuring continuous data transmission.

In a possible example, the resource allocation information may be: resource allocation information for a configured grant; and/or resource allocation information for a dynamic grant.

In a possible example, the first transmission resource satisfying the predetermined condition may include: the first transmission resource crossing a slot boundary; and/or the first transmission resource being a transmission signal across channels with a high priority.

In a possible example, in receiving the data transmission performed by the terminal over the second transmission resource and/or the third transmission resource, the processing unit 402 may be configured to: invoke the communication unit 403 to receive first information transmitted by the terminal over the second transmission resource according to a second Modulation and Coding Scheme (MCS), and/or receive second information transmitted by the terminal over the third transmission resource according to a third MCS, the first information including first data, and the second information including second data. The first data and/or the second data is determined by the terminal based on a first MCS and a first time-frequency resource. The second MCS is determined by the terminal based on the second transmission resource, and the third MCS is determined by the terminal based on the third transmission resource.

In a possible example, the first information and the second information may further include Uplink Control Information (UCI).

In a possible example, a transmission resource occupied by the UCI may be determined by the terminal based on the first time-frequency resource, the first MCS, and a β offset.

In a possible example, the configured grant may be a Type 1 configured grant, and the first time-frequency resource, the first MCS, and the β offset may be configured by Radio Resource Control (RRC) information.

In a possible example, the configured grant may be a Type 2 configured grant, the first time-frequency resource and the first MCS may be configured by Downlink Control Information (DCI) for activating the Type 2 configured grant, and the β offset may be configured by Radio Resource Control (RRC) information or the DCI for activating the Type 2 configured grant.

In a possible example, the data transmission may be a dynamic grant, the first time-frequency resource and the first MCS may be configured by Downlink Control Information (DCI) for scheduling the dynamic grant, and the β offset may be configured by Radio Resource Control (RRC) information or the DCI for scheduling the dynamic grant.

In a possible example, the transmission resource occupied by the UCI may be determined by the terminal based on a β offset, the second MCS, and the second time-frequency resource; and/or the transmission resource occupied by the UCI may be determined by the terminal based on the β offset, the third MCS, and the third time-frequency resource.

In a possible example, the β offset may be configured by Radio Resource Control (RRC) information or Downlink Control Information (DCI) for activating a Type 2 configured grant.

In a possible example, the second MCS and the second time-frequency resource may be determined by the terminal by means of resource partitioning based on the first MCS and the first time-frequency resource, and the third MCS and the third time-frequency resource may be determined by the terminal by means of resource partitioning based on the first MCS and the first time-frequency resource.

In a possible example, in receiving the data transmission performed by the terminal over the second transmission resource and/or the third transmission resource, the processing unit 402 may be configured to invoke the communication unit 403 to receive the data transmission performed by the terminal over a fourth transmission resource and/or a fifth transmission resource, the fourth transmission resource including at least the second transmission resource, and the fifth transmission resource including at least the third transmission resource.

In a possible example, a code rate used for the data transmitted over the second transmission resource may be greater than a predetermined threshold; and the fourth transmission resource may further include a previous transmission resource adjacent to the second transmission resource.

In a possible example, a code rate used for the data transmitted over the third transmission resource may be greater than the predetermined threshold; and the fifth transmission resource may further include a subsequent transmission resource adjacent to the third transmission resource.

In a possible example, in receiving the data transmission performed by the terminal over the second transmission resource and/or the third transmission resource, the processing unit 402 may be configured to: invoke the communication unit 403 to receive third data transmitted by the terminal over the second transmission resource, the third data including part or all of fourth data, which is transmitted over a previous transmission resource adjacent to the second transmission resource; and/or invoke the communication unit 403 to receive fifth data transmitted by the terminal over the third transmission resource, the fifth data including part or all of sixth data, which is transmitted over a subsequent transmission resource adjacent to the third transmission resource.

In a possible example, if the second transmission resource or the third transmission resource has no adjacent transmission resource in a slot where it is located, no data transmission may be performed with the terminal over the second transmission resource or the third transmission resource.

In a possible example, the resource allocation information being for use by the terminal to determine the first transmission resource may include: the resource allocation information including time-domain resource allocation information in Downlink Control Information (DCI) for activating a Type 2 configured grant, the time-domain resource allocation information being for use by the terminal to determine the first transmission resource.

In a possible example, the data transmission may be performed in a network on an unlicensed spectrum.

It can be appreciated that, since the method embodiments and the apparatus embodiments are different forms of the same technical concept, the content of the method embodiments in the present disclosure also applies to the apparatus embodiments, and details thereof will be omitted here.

Figure 5:
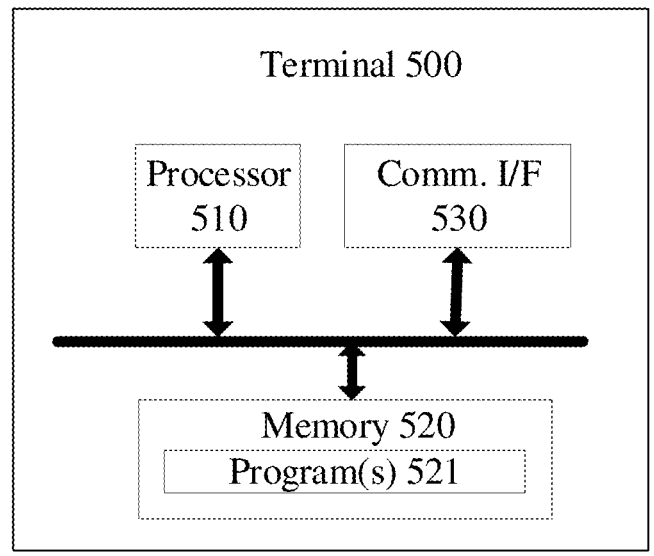
FIG. 5 is a schematic diagram showing a structure of a terminal according to an embodiment of the present disclosure.

Referring to FIG. 5, FIG. 5 is a schematic diagram showing a structure of a terminal 500 according to an embodiment of the present disclosure. As shown in FIG. 5, the terminal 500 may include a processor 510, a memory 520, a communication interface 530, and at least one communication bus for connecting the processor 510, the memory 520, and the communication interface 530.

The memory 520 may include, but not limited to, Random Access Memory (RAM), Read-Only Memory (ROM), Erasable Programmable Read Only Memory (EPROM), or Compact Disc Read-Only Memory (CD-ROM). The memory 520 is used for related instructions and data.

The communication interface 530 is configured to receive and transmit data.

The processor 510 may be one or more Central Processing Units (CPUs). When the processor 510 is one CPU, the CPU may be a single-core CPU or a multi-core CPU.

The processor 510 in the terminal 500 is configured to read one or more program codes 521 stored in the memory 520, and perform the following operations: invoking the communication interface 530 to receive resource allocation information from a network device; determining a first transmission resource based on the resource allocation information; and invoking the communication interface 530 to perform data transmission with the network device over a second transmission resource and/or a third transmission resource when the first transmission resource satisfies a predetermined condition. The first transmission resource includes the second transmission resource and the third transmission resource.

It is to be noted that the implementation of each operation may also correspond to the corresponding description with reference to the method embodiment shown in FIG. 2A, and the terminal 500 may be configured to perform the method in the terminal according to the above method embodiment of the present disclosure.

In the terminal 500 described in FIG. 5, the transmission resource determined based on the resource allocation information can be partitioned into two transmission resources, and then data transmissions can be performed on the two resulting transmission resources, thereby avoiding insufficient transmission resources and transmission interruptions, which is advantageous in ensuring continuous data transmission.

Figure 6:
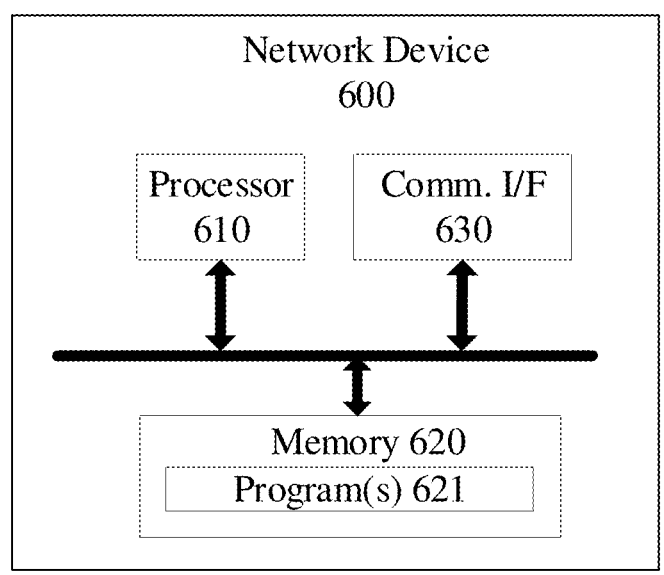
FIG. 6 is a schematic diagram showing a structure of a network device according to an embodiment of the present disclosure.

Referring to FIG. 6, FIG. 6 is a schematic diagram showing a structure of a network device 600 according to an embodiment of the present disclosure. As shown in FIG. 6, the network device 600 includes a processor 610, a memory 620, a communication interface 630, and at least one communication bus for connecting the processor 610, the memory 620, and the communication interface 630.

The memory 620 may include, but not limited to, Random Access Memory (RAM), Read-Only Memory (ROM), Erasable Programmable Read Only Memory (EPROM), or Compact Disc Read-Only Memory (CD-ROM). The memory 620 is used for related instructions and data.

The communication interface 630 is configured to receive and transmit data.

The processor 610 may be one or more Central Processing Units (CPUs). When the processor 610 is one CPU, the CPU may be a single-core CPU or a multi-core CPU.

The processor 610 in the terminal 600 is configured to read one or more program codes 621 stored in the memory 620, and perform the following operations: invoking the communication interface 630 to transmit resource allocation information to a terminal, for use by the terminal to determine a first transmission resource; and invoking the communication interface 630 to receive a data transmission performed by the terminal over a second transmission resource and/or a third transmission resource when the first transmission resource satisfies a predetermined condition. The first transmission resource includes the second transmission resource and the third transmission resource.

It is to be noted that the implementation of each operation may also correspond to the corresponding description with reference to the method embodiment shown in FIG. 2A, and the network device 600 may be configured to perform the method in the network device according to the above method embodiment of the present disclosure.

In the network device 600 described in FIG. 6, the resource allocation information can be transmitted to the terminal. The terminal can partition the transmission resource determined based on the resource allocation information into two transmission resources, and then perform data transmissions with the network device 600 on the two resulting transmission resources, thereby avoiding insufficient transmission resources and transmission interruptions, which is advantageous in ensuring continuous data transmission.

An embodiment of the present disclosure further provides a chip. The chip includes a processor configured to invoke and execute a computer program from a memory, to enable a device provided with the chip to perform some or all of the steps in any of the method embodiments of the present disclosure as described above in connection with the terminal.

An embodiment of the present disclosure further provides a computer-readable storage medium. The computer-readable storage medium stores a computer program for electronic data exchange. The computer program causes a computer to perform some or all of the steps in any of the method embodiments of the present disclosure as described above in connection with the terminal.

An embodiment of the present disclosure further provides a computer-readable storage medium. The computer-readable storage medium stores a computer program for electronic data exchange. The computer program causes a computer to perform some or all of the steps in any of the method embodiments of the present disclosure as described above in connection with the network device.

An embodiment of the present disclosure further provides a computer program product. The computer program product includes a computer program, which is operable to cause a computer to perform some or all of the steps in any of the method embodiments of the present disclosure as described above in connection with the terminal. The computer program product may be a software installation package.

The steps in the method or algorithm described in the embodiments of the present disclosure may be implemented in hardware, or may be implemented by a processor executing software instructions. The software instructions may be composed of corresponding software modules, which may be stored in a Random Access Memory (RAM), a flash memory, a Read Only Memory (ROM), an Erasable Programmable ROM (EPROM), an Electrically Erasable Programmable Read-Only Memory (EEPROM), a register, a hard disk, a removable hard disk, a Compact Disc Read Only Memory (CD-ROM), or any other form of storage medium known in the art. An exemplary storage medium is coupled to a processor, such that the processor can read information from, and write information to, the storage medium. Of course, the storage medium can also be a component of the processor. The processor and the storage medium may be provided in an ASIC. Additionally, the ASIC may be provided in an access network device, a target network device, or a core network device. Of course, the processor and the storage medium may be provided in an access network device, a target network device or a core network device as discrete components.

It can be appreciated by those skilled in the art that, in one or more of the above examples, the functions described in the embodiments of the present disclosure may be implemented in whole or in part by software, hardware, firmware, or any combination thereof. When implemented in software, it can be implemented in whole or in part in the form of a computer program product. The computer program product includes one or more computer instructions. When the computer program instructions are loaded and executed on a computer, all or part of the processes or functions described in the embodiments of the present disclosure are generated. The computer may be a general purpose computer, a special purpose computer, a computer network, or any other programmable device. The computer instructions may be stored in a computer-readable storage medium, or transmitted from one computer-readable storage medium to another. For example, the computer instructions may be transmitted from a website, computer, server, or data center to another website, computer, server, or data center via wired communication (e.g., coaxial cable, optical fiber, or Digital Subscriber Line (DSL)) or wireless communication (e.g., infrared, wireless, microwave, etc.). The computer-readable storage medium may be any available medium that can be accessed by a computer, or a data storage device including one or more available mediums, such as a server, a data center, etc. The available mediums may include magnetic mediums (e.g., floppy disks, hard disks, magnetic tapes), optical medium (e.g., Digital Video Disc (DVD)), or semiconductor mediums (e.g., Solid State Disk (SSD)), etc.

With the specific embodiments described above, the objects, technical solutions and advantageous effects of the embodiments of the present disclosure have been described in further detail. It can be appreciated that the above descriptions only illustrate some specific implementations of the embodiments of the present disclosure, and are not intended to limit scope of the embodiments of the present disclosure. Any modifications, equivalent alternatives, improvements, etc. that are made on the basis of the technical solutions of the embodiments of the present disclosure are to be encompassed by the scope of the embodiments of the present disclosure.

What is claimed is:

1. A data transmission method, comprising:
receiving, by a terminal, resource allocation information from a network device;
determining, by the terminal, a first transmission resource based on the resource allocation information; and
performing, by the terminal, data transmission with the network device over a second transmission resource and a third transmission resource in case that the first transmission resource satisfies a predetermined condition, wherein the first transmission resource includes the second transmission resource and the third transmission resource, the second transmission resource and the third transmission resource are adjacent transmission resources obtained by directly partitioning the first transmission resource, and the second transmission resource and the third transmission resource are located at different slots, wherein the first transmission resource satisfying the predetermined condition comprises: the first transmission resource crossing a slot boundary, and/or the first transmission resource being configured for a transmission signal across channels with a high priority;
wherein the performing, by the terminal, the data transmission with the network device over the second transmission resource and the third transmission resource comprises:
transmitting, by the terminal, third data to the network device over the second transmission resource, the third data including part or all of fourth data, the fourth data being transmitted over a previous transmission resource adjacent to the second transmission resource; and
transmitting, by the terminal, fifth data to the network device over the third transmission resource, the fifth data including part or all of sixth data, the sixth data being transmitted over a subsequent transmission resource adjacent to the third transmission resource.

2. The method according to claim 1, wherein the performing, by the terminal, the data transmission with the network device over the second transmission resource and the third transmission resource comprises:
determining, by the terminal, first data and/or second data based on a first Modulation and Coding Scheme (MCS) and a first time-frequency resource;
determining, by the terminal, a second MCS based on the second transmission resource, and determining, by the terminal, a third MCS based on the third transmission resource; and
transmitting, by the terminal, first information with the network device over the second transmission resource according to the second MCS, and transmitting, by the terminal, second information with the network device over the third transmission resource according to the third MCS, the first information including the first data, and the second information including the second data, wherein the first information and the second information further comprise Uplink Control Information (UCI).

3. The method according to claim 2, further comprising:
determining, by the terminal, a transmission resource occupied by the UCI based on the first time-frequency resource, the first MCS, and a β offset.

4. The method according to claim 2, further comprising:
determining, by the terminal, a transmission resource occupied by the UCI based on a β offset, the second MCS and a second time-frequency resource; and/or
determining, by the terminal, the transmission resource occupied by the UCI based on the β offset, the third MCS and a third time-frequency resource.

5. The method according to claim 1, wherein the performing, by the terminal, the data transmission with the network device over the second transmission resource and the third transmission resource comprises:
performing the data transmission with the network device over a fourth transmission resource and a fifth transmission resource, the fourth transmission resource including at least the second transmission resource, and the fifth transmission resource including at least the third transmission resource.

6. A terminal, comprising a processor, a memory, a communication interface, and one or more programs, the one or more programs being stored in the memory and configured to be executed by the processor, the one or more programs comprising instructions for:
receiving resource allocation information from a network device;
determining a first transmission resource based on the resource allocation information; and
performing data transmission with the network device over a second transmission resource and a third transmission resource in case that the first transmission resource satisfies a predetermined condition, wherein the first transmission resource includes the second transmission resource and the third transmission resource, the second transmission resource and the third transmission resource are adjacent transmission resources obtained by directly partitioning the first transmission resource, and the second transmission resource and the third transmission resource are located at different slots, wherein the first transmission resource satisfying the predetermined condition comprises: the first transmission resource crossing a slot boundary, and/or the first transmission resource being configured for a transmission signal across channels with a high priority;
wherein the performing the data transmission with the network device over the second transmission resource and the third transmission resource comprises:
transmitting third data to the network device over the second transmission resource, the third data including part or all of fourth data, the fourth data being transmitted over a previous transmission resource adjacent to the second transmission resource; and
transmitting fifth data to the network device over the third transmission resource, the fifth data including part or all of sixth data, the sixth data being transmitted over a subsequent transmission resource adjacent to the third transmission resource.

7. The terminal according to claim 6, wherein the performing the data transmission with the network device over the second transmission resource and the third transmission resource comprises:
   determining first data and/or second data based on a first Modulation and Coding Scheme (MCS) and a first time-frequency resource;
   determining a second MCS based on the second transmission resource, and determining a third MCS based on the third transmission resource; and
   transmitting first information with the network device over the second transmission resource according to the second MCS, and transmitting second information with the network device over the third transmission resource according to the third MCS, the first information including the first data, and the second information including the second data,
   wherein the first information and the second information further comprise Uplink Control Information (UCI).

8. The terminal according to claim 7, wherein the one or more programs further comprise instructions for:
   determining a transmission resource occupied by the UCI based on the first time-frequency resource, the first MCS, and a β offset.

9. The terminal according to claim 7, wherein the one or more programs further comprise instructions for:
   determining a transmission resource occupied by the UCI based on a β offset, the second MCS and a second time-frequency resource; and/or
   determining the transmission resource occupied by the UCI based on the β offset, the third MCS and a third time-frequency resource.

10. The terminal according to claim 6, wherein the performing the data transmission with the network device over the second transmission resource and the third transmission resource comprises:
    performing the data transmission with the network device over a fourth transmission resource and a fifth transmission resource, the fourth transmission resource including at least the second transmission resource, and the fifth transmission resource including at least the third transmission resource.

11. A network device, comprising a processor, a memory, a communication interface, and one or more programs, the one or more programs being stored in the memory and configured to be executed by the processor, the one or more programs comprising instructions for:
    transmitting resource allocation information to a terminal, wherein the resource allocation information is used for determining a first transmission resource by the terminal; and
    receiving a data transmission performed by the terminal over a second transmission resource and a third transmission resource in case that the first transmission resource satisfies a predetermined condition, wherein the first transmission resource includes the second transmission resource and the third transmission resource, the second transmission resource and the third transmission resource are adjacent transmission resources obtained by directly partitioning the first transmission resource, and the second transmission resource and the third transmission resource are located at different slots, wherein the first transmission resource satisfying the predetermined condition comprises: the first transmission resource crossing a slot boundary, and/or the first transmission resource being configured for a transmission signal across channels with a high priority;
    wherein the receiving the data transmission performed by the terminal over the second transmission resource and the third transmission resource comprises:
       receiving third data transmitted by the terminal over the second transmission resource, the third data including part or all of fourth data, the fourth data being transmitted over a previous transmission resource adjacent to the second transmission resource; and
       receiving fifth data transmitted by the terminal over the third transmission resource, the fifth data including part or all of sixth data, the sixth data being transmitted over a subsequent transmission resource adjacent to the third transmission resource.

12. The network device according to claim 4, wherein the receiving the data transmission performed by the terminal over the second transmission resource and the third transmission resource comprises:
    receiving first information transmitted by the terminal over the second transmission resource based on a second Modulation and Coding Scheme (MCS), and receiving second information transmitted by the terminal over the third transmission resource based on a third MCS, the first information including first data, and the second information including second data,
    wherein the first data and/or the second data is determined by the terminal based on a first MCS and a first time-frequency resource, and
    wherein the second MCS is determined by the terminal based on the second transmission resource, and the third MCS is determined by the terminal based on the third transmission resource,
    wherein the first information and the second information further comprise Uplink Control Information (UCI).

13. The network device according to claim 12, wherein a transmission resource occupied by the UCI is determined by the terminal based on the first time-frequency resource, the first MCS, and a β offset.

14. The network device according to claim 12, wherein the transmission resource occupied by the UCI is determined by the terminal based on a β offset, the second MCS, and a second time-frequency resource; and/or
    the transmission resource occupied by the UCI is determined by the terminal based on the β offset, the third MCS, and a third time-frequency resource.

15. The network device according to claim 4, wherein the receiving the data transmission performed by the terminal over the second transmission resource and the third transmission resource comprises:
    receiving the data transmission performed by the terminal over a fourth transmission resource and a fifth transmission resource, the fourth transmission resource including at least the second transmission resource, and the fifth transmission resource including at least the third transmission resource.

\* \* \* \* \*